Nov. 27, 1951   A. J. KREINER   2,576,300
AXIALLY ADJUSTABLE ROTARY VALVE
Filed May 28, 1945

INVENTOR.
ANTHONY J. KREINER
BY
Kwis Hudson Boughton & Williams
ATTORNEYS

Patented Nov. 27, 1951 2,576,300

UNITED STATES PATENT OFFICE 2,576,300

AXIALLY ADJUSTABLE ROTARY VALVE

Anthony J. Kreiner, Wickliffe, Ohio

Application May 28, 1945, Serial No. 596,265

4 Claims. (Cl. 251—91)

This invention relates to an improved construction applicable to valves, fluid transfer mechanisms and various other apparatus of the kind embodying a rotary part or control member and in which a seal must be maintained to prevent leakage of the fluid.

In apparatus of this character, and particularly in valves intended to handle fluid pressures of one thousand pounds per square inch and upwards, it has usually been necessary to construct the cooperating relatively movable parts with extreme accuracy and very small tolerance so as to obtain a satisfactory seal which will minimize or prevent leakage of the fluid. This degree of accuracy has necessitated the use of special manufacturing apparatus and precision operations which greatly increase the cost of production. In addition to such increased cost of manufacture it has been found that valves and other devices of this kind are frequently subject to sticking or seizing of the movable valve member due to the fact that the annular clearance cannot, in usual constructions, be controlled in all planes, and this is a troublesome condition for which, so far as I am aware, no satisfactory solution has heretofore been found.

The present invention seeks to overcome these difficulties, and accordingly, provides an improved form of valve as well as a novel sealing structure for valves, fluid transfer mechanisms and various other apparatus of this character.

Another object of the invention is to provide a novel structure for obtaining a good seal between cooperating relatively movable metal parts in valves and other devices, without resorting to precision manufacturing operations and close tolerances which increase the cost of production and contribute to sticking or seizing of the movable parts and without incorporating an additional adjusting means in the device.

A further object of this invention is to provide an improved valve and sealing structure of this character, embodying a housing and rotor having cooperating tapered annular sealing surfaces and means for establishing and maintaining a desired annular and longitudinal clearance between such tapered sealing surfaces.

Other objects and advantages of the invention will be apparent from the following detailed description when taken in conjunction with the accompanying sheet of drawings, wherein.

Figures 1, 2, 3, 4:
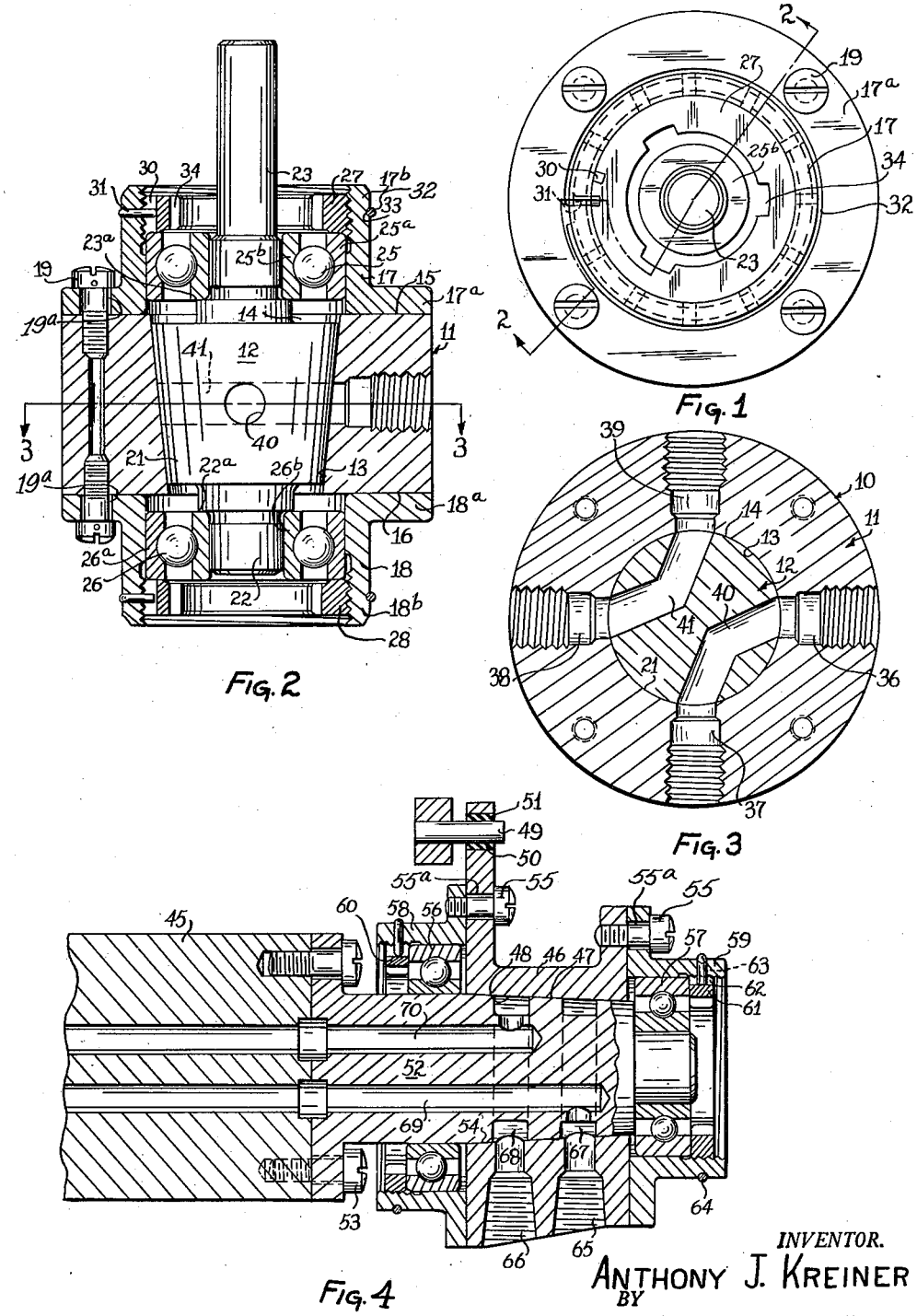
Fig. 1 is a top plan view of a valve embodying the present invention.
Fig. 2 is a vertical sectional view taken through the valve substantially as indicated by line 2—2 of Fig. 1.
Fig. 3 is a transverse sectional view taken on line 3—3 of Fig. 2.
Fig. 4 is a longitudinal sectional view taken through a fluid transfer mechanism representing another embodiment of the invention.

Figs. 1 to 3 inclusive of the drawings show a valve 10, which is novel in itself will be explained in greater detail hereinafter, and which represents one embodiment or application of the novel sealing structure of this invention. The valve here shown comprises a housing 11 and a rotor or valve plug 12 operable therein.

The housing 11 has a concave tapered annular sealing surface 13 therein defining a tapered opening 14 which extends through the housing. The housing is also provided with flat end faces 15 and 16 lying in substantially parallel planes and through which the tapered opening 14 extends. As shown in the drawing, the housing 11 includes a pair of bearing holders 17 and 18 having flange or disk portions 17a and 18a which engage, respectively, the end faces 15 and 16 and are held thereagainst by the clamping screws 19. The bearing holders 17 and 18 include sleeve portions 17b and 18b which extend away from the body of the housing 11 in substantially coaxial relation with the tapered opening 14 of the latter. It will be noted that the openings 19a of the bearing holders through which the screws 19 extend are somewhat larger in size than the stems of these screws.

The valve member or plug 12, which may be oscillatable or rotatable in the housing 11 and which is hereinafter referred to as a rotor, comprises a body having a convex tapered annular sealing surface 21 which cooperates with the concave tapered annular sealing surface 13 of the housing in a manner to be further explained hereinafter. The taper angles of the sealing surfaces 13 and 21 of the housing and rotor are substantially identical so that these sealing surfaces will cooperate in an efficient manner for the purpose intended. The rotor 12 is also provided with integral axial stem portions 22 and 23 projecting therefrom in opposite directions and extending coaxially of the sleeve portions of the bearing holders 17 and 18. The stem portion 23 has a shoulder 23a thereon and is preferably of a length such that is projects outwardly beyond the outer end of the bearing holder 17. This outwardly projecting portion of the stem 23 provides an actuating stem or shaft for the rotor 12 to which a suitable actuating handle or tool (not shown) can be applied. The stem portion 22 has a similar shoulder 22a thereon.

The rotor 12 is operably mounted in the tapered opening 14 of the housing 11 by means of suitable bearings 25 and 26 located, respectively, in the bearing holders 17 and 18 and which preferably are anti-friction bearings as here shown. The outer races 25a and 26a of these bearings are seated in the sleeve portions of the bearing holders and the inner races 25b and 26b tightly surround the stem portions 22 and 23 of the rotor with their adjacent ends engaging the shoulders 22a and 23a of these stem portions. Externally threaded bearing retainers or nuts 27 and 28 are provided for the respective bearings 25 and 26 and engage in internally threaded portions provided adjacent the outer ends of the bearing holders.

For a purpose to be more fully explained hereinafter, the bearing retainers 27 and 28 are axially adjustable in the threaded openings of the bearing holders and are adapted to be held in a desired position of adjustment by suitable locking means. In this instance the locking means comprises a series of annularly spaced slots or recesses 30 formed in the outer periphery of the bearing retainers and a locking projection 31 which extends substantially radially inwardly through an opening of the bearing holder and is engageable in one of these locking recesses. The locking projection 31 preferably is an integral part of a contractable wire spring 32 commonly referred to as a G-spring which is disposed around the bearing holder and engages in an external annular groove 33 of the latter. To facilitate the operation of screwing the bearing retainers inwardly or outwardly of the bearing holders, these retainers can be provided internally thereof with annularly spaced tool-receiving notches or recesses 34.

The valve 10 may embody any desired arrangement of passages and fluid control ports. In the embodiment here shown the housing 11 is provided with fluid control ports or connections 36, 37, 38 and 39 and the rotor 12 is provided with fluid passages 40 and 41. In the position of the rotor as shown in Figs. 2 and 3, the passage 40 connects the ports 36 and 37 and the passage 41 connects the ports 38 and 39. By movement of the rotor in either direction through an appropriate arcuate distance, the passages 40 and 41 will be disconnected from the ports of the housing and the latter will be closed by portions of the tapered annular sealing surface 21 of the rotor.

In constructing the valve 10 the tapered opening 14 of the housing 11 is ground or otherwise finished with a reasonable diametral tolerance such as one or two thousandths of an inch. The end faces 15 and 16 of the housing are ground or otherwise finished so that they will be square with the axis of the tapered opening. The rotor 12 may be ground or otherwise finished and the rotor and housing should preferably be lapped together prior to final assembly.

The assembly and relative positioning of the above described parts of the valve 10 is important and will be described next. In the assembly operation the rotor 12 is pushed tightly into the tapered opening 14 so as to be temporarily seated in the housing and thereby definitely located in coaxial relation to the tapered opening. The anti-friction bearings 25 and 26 are assembled onto the stem portions 22 and 23 of the rotor and will be definitely positioned by the latter in a radial direction so as to also be located in coaxial relation to the tapered opening. The bearing holders 17 and 18 are then assembled over the bearings and they, in turn, will be positioned in coaxial relation to the tapered opening by the bearings. The bearing holders are then clamped to the housing by inserting and tightening the above mentioned screws 19.

In thus assembling the holders 17 and 18 over the anti-friction bearings 25 and 26 these holders will, without restraint or interference, align themselves with the common axis of the housing 11 and rotor 12. In other words, the above-described construction and assembly procedure provides the effect of an accurate adjustment or positioning of these parts in a radial direction, and this is accomplished in a simple and direct manner during the assembling operation and without the necessity of providing additional elaborate adjusting means or requiring careful manipulation and checking of such additional adjusting means.

After the bearing holders 17 and 18 have been mounted on the housing 11 and positioned radially of the common axis, as just described above, the bearing retainers 27 and 28 are then screwed into the bearing holders 17 and 18 and drawn up firmly against the outer races 25a and 26a of the bearings. The position of the slots 30 of the upper bearing retainer 27 is then noted with respect to the locking projection 31 or some other reference point.

The next step of the assembly operation is one in which an axial positioning of the rotor 12 is obtained. In the accomplishment of this step the upper retainer 27 is screwed outwardly in the bearing holder 17 a distance corresponding with a desired number of increments, such as a desired number of the spaces between the locking recesses 30. The lower bearing retainer 28 is then screwed further into the bearing holder 18 thereby lifting the rotor 12 away from its temporary seating engagement in the tapered opening 14 so as to establish a desired annular clearance between and for substantially the full axial length of the tapered sealing surfaces 21 and 13 of the rotor and housing. When this desired annular clearance has been established the bearing retainers 27 and 28 are thereafter held against further rotary movement by the locking projections 31.

The construction of the parts and the assembly method described above provide a relative positioning both radially and axially of the common axis by which a desired annular clearance is established and maintained between the sealing surfaces 21 and 13 of the rotor and housing. This clearance is preferably of a width or dimension such that rubbing or frictional contact between the sealing surfaces is prevented but insufficient to prevent an effective seal from being formed between these sealing surfaces. The construction above described makes it possible to obtain a small clearance of this kind which will effectively prevent the objectionable sticking or seizing mentioned above. Moreover the clearance thus provided will be small enough for the handling of high pressure fluids with a minimum amount of leakage and can be obtained without resorting to extremely close manufacturing tolerances and precision operations.

The above-described clearance between the rotor 12 and housing 11 is adjustable and is positively and continuously maintained for all operating positions of the rotor and extends continuously around the circumference and along the length of the rotor. That this clearance will be maintained is evident from the fact that the rotor is restrained from moving in either a radial or axial direction, and hence, cannot change the condition of clearance between itself and the housing bore. By maintaining this intervening clearance space between the rotor and housing it will be seen that the only rubbing metal contacts will be in the bearings 25 and 26 and there will consequently be only a minimum fractional drag and hence only an extremely small actuating force will need to be applied to the stem 23 in actuating the rotor. Moreover, the actuating force needed can be definitely determined as to its value or magnitude and will remain substantially constant during subsequent operations of the rotor.

Fig. 4 of the drawings shows another embodiment of the present invention in the form of a fluid transmission mechanism which is novel in itself and which represents another application or use for my novel sealing structure. This fluid transmission mechanism is intended for use in introducing fluid under pressure into or through a rotary shaft 45 which may be a part of any rotary device to or through which fluid under pressure is to be delivered or circulated.

This transfer mechanism includes a housing 46 having therein a tapered annular sealing surface 47 defining a tapered opening 48 corresponding with the tapered opening 14 of the above described valve 10. The housing 46 is non-rotatable and can be held substantially stationary by suitable means such as an anchor pin 49 extending through an opening 50 and insulated from metallic contact with the housing by means of a soft rubber bushing 51. This mechanism also includes a rotor 52 which may be an extension of the rotary shaft 45, or preferably as here shown, is in the form of a body or plug attached to the end of the shaft as by means of the screws 53. The rotor 52 extends into the tapered opening 48 of the housing 46 and has a tapered annular sealing surface 54 thereon which cooperates with the tapered sealing surface 48 of the housing.

The housing 46 is here shown as being carried by the rotor 52 and the housing and rotor are maintained in assembled coaxial relation by means of axially spaced mounting bearings 56 and 57 which correspond with the bearings 25 and 26 of the valve 10. The housing 46 includes axially aligned bearing holders 58 and 59 in which the bearings 56 and 57 are mounted and retained by adjustable bearing retainers 60 and 61. The bearing retainers are screwed into the internally threaded openings of the bearing holders and can be maintained in a desired position of adjustment by locking means comprising circumferentially spaced recesses 62 and locking projections 63 engageable in such recess. The locking projections 63 are carried by G-springs 64 mounted on the bearing holders. The bearing holders 58 and 59 are adapted to be clamped to the housing 46 by screws 55 extending through openings 55a which are somewhat larger than the stems of the screws so as to permit centering of the bearing holders by the rotor 52 during assembly.

In the fluid transfer mechanism here shown, the housing 46 is provided with fluid supply and discharge connections 65 and 66 which communicate respectively with annular grooves 67 and 68 provided on the tapered portion of the rotor 52. Fluid conducting passages 69 and 70 formed in the rotor 52 and in the shaft 45 communicate with the annular grooves 67 and 68. In this instance, the grooves 67 and 68 provide for maintaining the passages 69 and 70 in continuous communication respectively with the connections 65 and 66.

In the fluid transfer mechanism just described, the assembly and adjustment operations for the rotor and housing are accomplished in substantially the same manner as explained above for the valve 10 and, when the housing and rotor have been thus assembled and relatively adjusted, the tapered surfaces thereof will cooperate to provide an efficient fluid seal and a desired clearance space between the rotor and housing will be established and maintained in the same way and for the same purposes as has been described above for the valve 10.

From the foregoing description and the accompanying drawings it will now be readily understood that the present invention provides a novel sealing structure by which an efficient seal is provided between a housing and rotor without resorting to the use of an additional adjusting means or to extremely close tolerances and precision manufacturing operations, and in which sticking or seizing between the rotor and housing are substantially eliminated. It will also be understood that the above described valve and fluid transfer mechanism embodying this sealing structure are novel in themselves and represent distinct improvements in the art.

While I have illustrated and described my invention in considerable detail it will be understood, of course, that the invention is not to be regarded as limited correspondingly in scope but includes all modifications and changes coming within the spirit and scope of the claims hereof.

Having thus described my invention, I claim:

1. A structure of the character described comprising, a housing having therein a fluid passage and a tapered internal annular sealing surface defining a tapered opening, said housing also having substantially flat transverse end faces thereon at opposite ends of said tapered opening, a rotor rotatable in said opening for cooperation with said fluid passage and having a tapered external annular sealing surface thereon, the taper angle and diameter of said rotor being such in relation to the taper angle and diameter of said tapered opening that said rotor will have an initial relatively tight-fitting surface-to-surface engagement in said tapered opening when fully inserted thereinto, bearing holders carried by said housing adjacent opposite ends of the tapered opening and disposed substantially in coaxial relation to said tapered opening, bearings in said holders and engaging portions of the rotor for mounting the latter in said housing with the tapered surface of the rotor in substantially fluid-tight cooperation with the tapered surface of said housing but with a small annular clearance therebetween, said bearing holders having flat faces engaging said flat end faces and being initially shiftable relative to said housing and substantially radially of said tapered opening so as to permit centering thereof by said rotor through said bearings while the rotor is in said tight-fitting engagement, means for clampingly attaching the bearing holders to said housing so as to retain said holders in their centered relation, said bearings being adjustably movable in said holders for shifting the rotor axially out of said tight-fitting engagement and being adapted to hold said rotor relative to said housing so as to maintain said small annular clearance between said tapered surfaces, and means on said holders for producing such adjusting movement of the bearings and said axial shifting of the rotor.

2. A valve comprising, a valve housing having therein a fluid passage and a tapered internal annular sealing surface defining a tapered opening, said housing also having substantially flat transverse end faces thereon at opposite ends of said tapered opening, a valve plug rotatable in said tapered opening for controlling said fluid passage and having a tapered external annular sealing surface thereon, the taper angle and diameter of said plug being such in relation to the taper angle and diameter of said tapered opening that said plug will have an initial relatively tight-fitting surface-to-surface engagement in said tapered opening when fully inserted thereinto, bearing holders having substantially flat faces engaging the flat end faces of said housing, bearings in said holders and engaging portions of said plug for mounting the latter in said housing with the tapered surface of the plug in substantially fluid-tight cooperation with the tapered surface of said housing but with an annular clearance therebetween of a width to substantially eliminate frictional drag without incurring fluid leakage, connecting members connecting said bearing holders with said housing, said bearing holders having openings therein through which said connecting members extend and which openings are of larger size than said connecting members whereby said bearing holders are initially shiftable relative to said housing and substantially radially of said tapered opening for centering of said bearing holders by said plug through said bearings while said plug is in said tight-fitting engagement, said connecting members cooperating with said bearing holders and housing as a clamping means for retaining said holders in their centered relation, said bearings being adjustably movable in said holders for shifting said plug axially out of said tight-fitting engagement and being adapted to hold said plug relative to said housing so as to maintain said annular clearance between said tapered surfaces, and retainer means axially shiftable in said holders for producing such adjusting movement of said bearings and said axial shifting of said plug.

3. A structure of the character described comprising, a rotatable part containing a fluid passage, a housing having therein a fluid passage and a tapered internal annular sealing surface defining a tapered opening extending substantially coaxially with said part, said housing also having substantially flat transverse end faces thereon at opposite ends of said tapered opening, said housing being non-rotatable but adapted for limited shifting axially of said part, a rotor connected with said part for coaxial rotation therewith and extending into said housing, said rotor having a fluid passage therein for connecting the fluid passages of said housing and part and also having thereon a tapered external annular sealing surface, the taper angle and diameter of said rotor being such in relation to the taper angle and diameter of said tapered opening that said rotor will have an initial relatively tight-fitting engagement in said tapered opening when fully inserted thereinto, bearing holders connected with said housing adjacent opposite ends of said tapered opening and disposed substantially in coaxial relation to said tapered opening, bearings in said holders engaging portions of the rotor for mounting said housing on said rotor with the tapered surfaces of the housing and rotor in substantially fluid-tight cooperation but with a small annular clearance therebetween, said bearing holders having flat faces engaging said flat end faces and being initially shiftable relative to said housing and substantially radially of said tapered opening so as to permit centering thereof by said rotor through said bearings while the rotor is in said tight-fitting engagement, means for clampingly attaching the bearing holders to said housing so as to retain said holders in their centered relation, said bearings being adjustably movable in said holders for causing relative axial shifting between said rotor and housing for relieving said tight-fitting engagement and for establishing and maintaining said small annular clearance between said tapered surfaces, and bearing retainers adjustable in said bearing holders for causing such adjusting movement of the bearings and said relative axial shifting between said rotor and housing.

4. A valve comprising, a valve housing having therein a fluid passage and a tapered internal annular sealing surface defining a tapered opening, said housing also having substantially flat transverse end faces thereon at opposite ends of said tapered opening, a valve plug rotatable in said tapered opening for controlling said fluid passage and having a tapered external annular sealing surface thereon, the taper angle and diameter of said plug being such in relation to the taper angle and diameter of said tapered opening that said plug will have an initial relatively tight-fitting surface-to-surface engagement in said tapered opening when fully inserted thereinto, bearing holders having substantially flat faces engaging the flat end faces of said housing, bearings in said holders and engaging portions of said plug for mounting the latter in said housing with the tapered surface of the plug in substantially fluid-tight cooperation with the tapered surface of said housing but with an annular clearance therebetween of a width to substantially eliminate frictional drag without incurring fluid leakage, connecting members connecting said bearing holders with said housing, said bearing holders having openings therein through which said connecting members extend and which openings are of larger size than said connecting members whereby said bearing holders are initially shiftable relative to said housing and substantially radially of said tapered opening for centering of said bearing holders by said plug through said bearings while said plug is in said tight-fitting engagement, said connecting members cooperating with said bearing holders and housing as a clamping means for retaining said holders in their centered relation, said bearings being adjustably movable in said holders for shifting said plug axially out of said tight-fitting engagement and being adapted to hold said plug relative to said housing so as to maintain said annular clearance between said tapered surfaces, bearing retainers in said bearing holders and each having circumferentially spaced locking elements thereon, screw thread means connecting said retainers with said holders whereby said retainers are adapted to cause such adjusting movement of said bearings and said axial shifting of said plug, and spring ring members mounted on said holders and having locking finger portions engageable with said locking elements.

ANTHONY J. KREINER.

REFERENCES CITED

The following references are of record in the file of this patent:

UNITED STATES PATENTS

| Number | Name | Date |
|---|---|---|
| 159,198 | McNaughton | Jan. 26, 1875 |
| 1,840,784 | McMillan | Jan. 12, 1932 |
| 2,355,723 | Griffin | Aug. 15, 1944 |

FOREIGN PATENTS

| Number | Country | Date |
|---|---|---|
| 535,022 | France | Jan. 17, 1922 |